(12) United States Patent
Waters

(10) Patent No.: US 7,167,080 B2
(45) Date of Patent: Jan. 23, 2007

(54) MEMORY TAG

(75) Inventor: John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 10/697,430

(22) Filed: Oct. 31, 2003

(65) Prior Publication Data

US 2004/0100382 A1 May 27, 2004

(30) Foreign Application Priority Data

Nov. 21, 2002 (GB) .................................. 0227203.7

(51) Int. Cl.
*H04Q 5/22* (2006.01)
(52) U.S. Cl. ...................... 340/10.4; 713/183
(58) Field of Classification Search ............ 340/568.1, 340/568.2, 5.9, 10.2, 10.33, 572.1, 10.4; 713/183; 235/492; 342/44
See application file for complete search history.

(56) References Cited

U.S. PATENT DOCUMENTS 4,718,117 A * 1/1988 Ma et al. ..................... 455/314
5,708,419 A * 1/1998 Isaacson et al. ......... 340/572.5

FOREIGN PATENT DOCUMENTS

JP 2002259921 9/2002
WO WO98/20363 5/1998

* cited by examiner

*Primary Examiner*—Wendy R. Garber
*Assistant Examiner*—M Shimizu
(74) *Attorney, Agent, or Firm*—Foley & Lardner LLP

(57) ABSTRACT

A memory tag responsive to a signal generated by a reader, the tag comprising a resonant circuit part having a resonant frequency, the resonant frequency of the resonant circuit part being variable in accordance with data to be transmitted being variable to transmit data to the reader.

16 Claims, 5 Drawing Sheets

MEMORY TAG

FIELD OF THE INVENTION

This invention relates to a memory tag, and a reader.

BACKGROUND OF THE INVENTION

Memory tags in the form of Radio Frequency Identification (RFID) tags are well known in the prior art, and the technology is well established (see for example: RFID Handbook, Klaus Finkenzeller, 1999, John Wiley & Sons). RFID tags come in many forms but all comprise an integrated circuit with information stored on it and a coil which enables it to be interrogated by a read/write device generally referred to as a reader. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. In addition Hitachi has developed a memory tag referred to as a "mu-chip" which is a chip of 0.4 mm square and operates at 2.45 GHz. These smaller memory tags can be used in a variety of different applications. Some are even available for the tagging of pets by implantation.

Although it is known to provide tags with their own power source, in many applications the tag is also powered by the radio frequency signal generated by the reader. Such a known system is shown in FIG. 1 where a reader is indicated generally at 10 and a tag at 12. The reader 10 comprises a radio frequency generator 13 and a resonant circuit part 11, in the present example comprising an inductor 14 and a capacitor 15 connected in parallel. The inductor 14 comprises an antenna. The resonant circuit part will have a particular resonant frequency in accordance with the capacitance and inductance of the capacitor 15 and the inductor 14, and the frequency generator 13 is operated to generate a signal at that resonant frequency.

The tag 12 similarly comprises a resonant circuit part generally illustrated at 16, a rectifying circuit part generally indicated at 17 and a memory 18. The resonant circuit part 16 comprises an inductor 19 which again comprises in this example a loop antenna, and a capacitor 20. The resonant circuit part 16 will thus have a resonant frequency set by the inductor 19 and capacitor 20. The resonant frequency of the resonant circuit part 16 is selected to be the same as that of the reader 10. The rectifying part comprises a forward-biased diode 21 and a capacitor 22 and thus effectively acts as a half-ware rectifier.

When the reader 10 is brought sufficiently close to the tag 12, a signal generated by the frequency generator 13 will cause the resonant circuit part 11 to generate a high frequency electromagnetic field. When the resonant circuit part 16 is moved within this field, a current will be caused to flow in the resonant circuit part 16, drawing power from the time varying magnetic field generated by the reader. The rectifying circuit part 17 will then serve to smooth the voltage across the resonant frequency part and provide a DC power supply to the tag's memory 18. The rectifying circuit part 17 is sufficient to supply a sufficiently stable voltage to the memory 18 for the memory to operate.

To transmit data from the tag to the reader, the resonant circuit part is also provided with a switch 23, here comprising a field effect transistor (FET). The FET is connected to the memory by a control line 24. When the switch 23 is closed, it causes an increased current to flow in the tag resonant circuit part 16. This increase in current flow in the tag results in an increased current flow in the reader's resonant circuit part 11 which can be detected as a change in voltage drop across the reader inductor 14. Thus, by controlling the switch 23, data stored in the memory 18 of the tag 12 can be transmitted to the reader 10.

A problem in transmitting data from the tag in this manner arises because the memory 18 is also powered by energy drawn from the electromagnetic field of the reader 10. Thus, when the switch 23 is closed, the power source supplying the rectifying circuit 17 is effectively shorted out. Although variations in the voltage at the memory 18 will be to some extent be smoothed by the capacitor 22, there will nevertheless be undesirable voltage changes at the memory 18, necessitating the addition of power control circuitry.

An aim of the invention is to provide a tag which reduces or overcomes this problem.

SUMMARY OF THE INVENTION

According to a first aspect of the invention, we provide a memory tag responsive to a signal generated by a reader, the tag comprising a resonant circuit part having a resonant frequency, the resonant frequency of the resonant circuit part being variable in accordance with data to be transmitted to transmit data to the reader.

The resonant circuit part may comprise a variable capacitance element, the capacitance of the variable capacitance element being controllable to vary the resonant frequency of the resonant circuit part.

The resonant circuit part may comprise an inductor and a first capacitor, and wherein the variable capacitance element comprises a second capacitor connected in parallel with the first capacitor and in series with a switch operable to switch the second capacitor element out of the circuit.

The switch may comprise a field effect transistor.

The resonant circuit part may comprise an inductor, and the variable capacitance element may comprise a varactor diode connected in parallel with the inductor and wherein a control line is connected to the cathode of the varactor diode to vary the reverse bias voltage of the varactor diode.

The resonant circuit part may further comprise a first capacitor connected in parallel with the inductor.

The controllable capacitance element may be set to have a first capacitance corresponding to a binary "one" and a second capacitance corresponding to a binary "zero".

A rectifying circuit part may be operable to rectify a signal received from the resonant circuit part to supply power to a memory.

The memory tag may comprise an integrated circuit.

The inductor may comprise an antenna.

According to a second aspect of the invention, we provide a reader for reading a tag, the reader comprising a frequency source to generate a driving signal and a resonant circuit part connected to the frequency source operable to provide inductive coupling to a tag, the reader being operable to receive information from a tag via the resonant circuit part, the reader comprising a demodulator operable to compare a reference signal generated by the frequency source and a reflected signal from the resonant circuit part and generate an output depending on the relative phase of the reference signal and the reflected signal.

The demodulator may comprise a multiplier operable to multiply the reference signal and the reflected signal and a low pass filter to pass a signal corresponding to the relative phase.

According to a third aspect of the invention, we provide a method of transmitting data from a memory tag to a reader, wherein the tag comprises a resonant circuit part having a resonant frequency, the method comprising the steps of varying the resonant frequency of the resonant circuit part to transmit data to the reader.

The resonant circuit part may comprise a variable capacitance element, and the step of varying the resonant frequency of the resonant circuit part may comprise the step of varying the capacitance of the variable capacitance element.

According to a fourth aspect of the invention, we provide a method of reading data from a memory tag, the method comprising the step of supplying a driving signal to a resonant circuit part of a reader, comparing a reference signal corresponding to the driving signal and a reflected signal reflected from the resonant circuit part, and detecting the relative phase of the reference signal and the reflected signal.

The step of comparing the reflected signal and the reference signal may comprise multiplying the reflected signal and the reference signal, and passing the resulting signal through a low pass filter, wherein the output of the load pass filter is dependent on the relative phase.

BRIEF DESCRIPTION OF THE DRAWINGS

An embodiment of the present invention will now be described by way of example only with reference to the accompanying drawings, wherein.

DETAILED DESCRIPTION OF THE PREFERRED EMBODIMENTS

Figure 1:
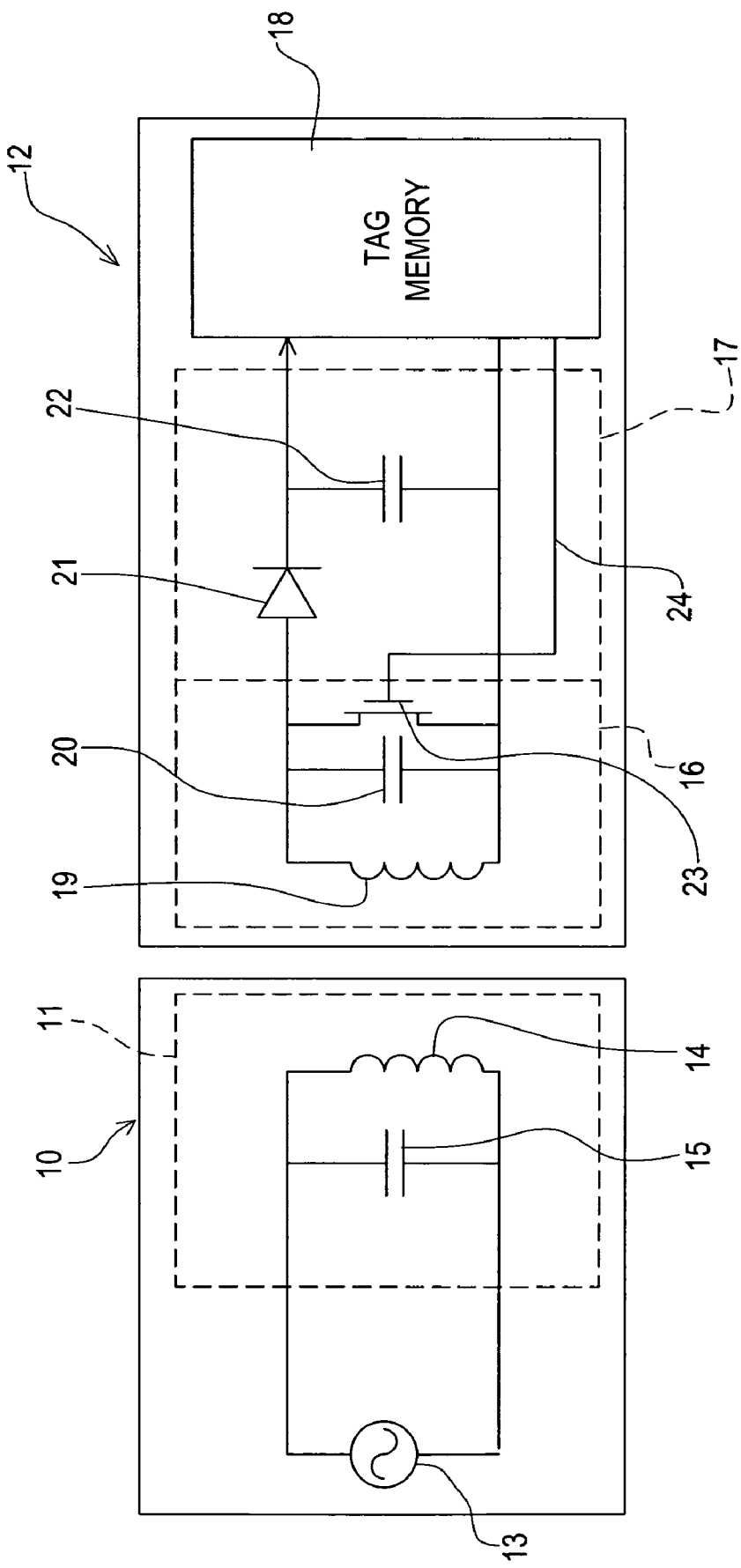
FIG. 1 is a schematic circuit diagram of a tag and reader of known type.
Figure 2:
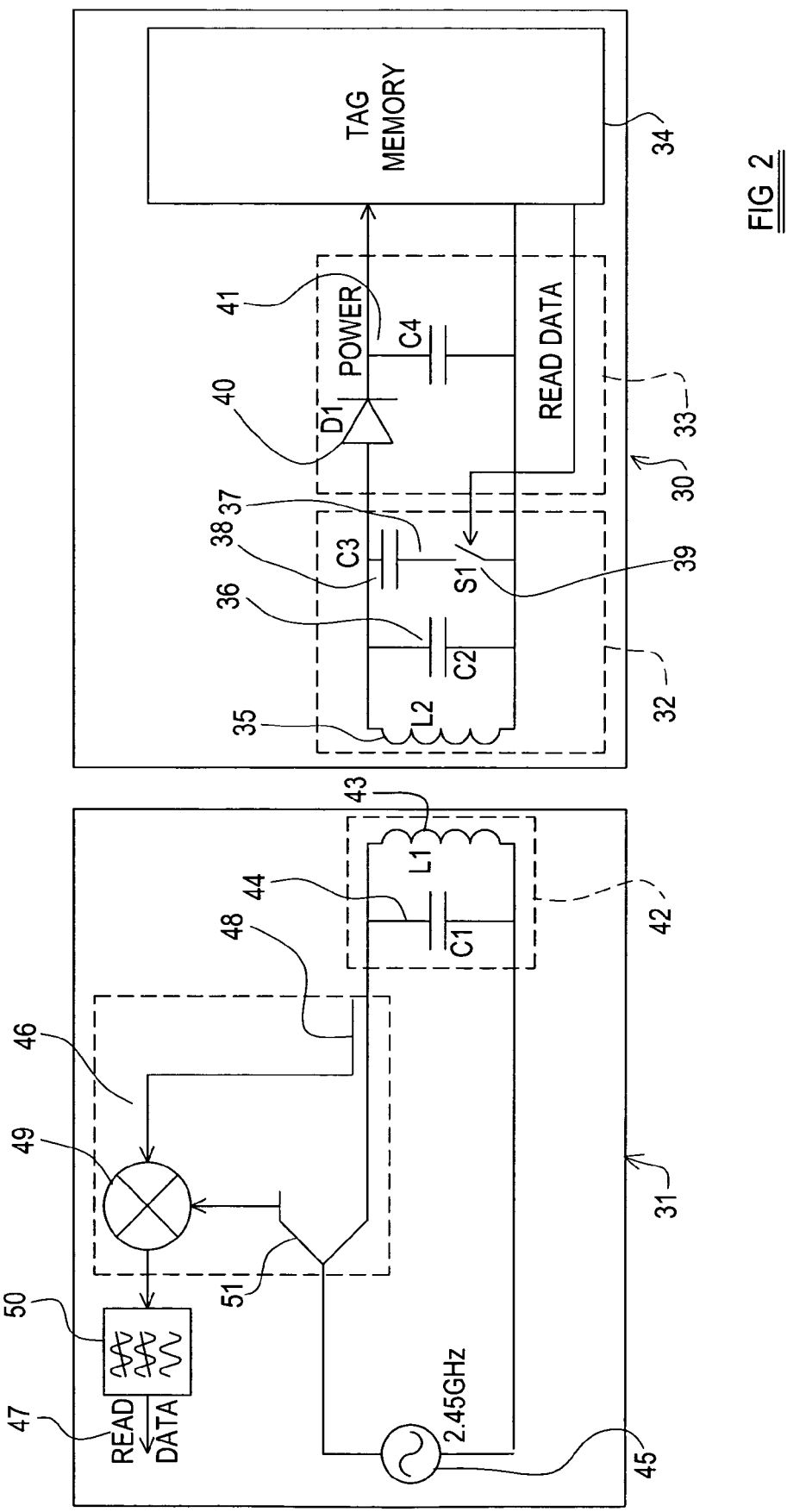
FIG. 2 is a diagrammatic illustration of a circuit for a tag and reader embodying the present invention.

Referring now to FIG. 2, a tag embodying the present invention is shown at 30 and a reader shown at 31. The tag 30 comprises a resonant circuit part 32 and a rectifying circuit part 33, together with a memory 34. The resonant circuit part 32 comprises an inductor L2 shown at 35 and a capacitor L2 shown at 36 connected in parallel in like manner to the tag 12 of FIG. 1. The resonant circuit part 32 further comprises a controllable capacitive element generally indicated at 37, in the example of FIG. 2 comprising a capacitor C3 shown at 38 and a switch S1 shown at 39. The rectifying circuit part 33 comprises a diode D1 shown at 40 connected to the resonant circuit part 32 in a forward biased direction and a capacitor C4 shown at 41 connected in parallel with the components of the resonant circuit part 32. The rectifying circuit part 33 operates in like manner to the rectifying circuit part 17 of FIG. 1 as a half-wave rectifier to provide power to the memory 34.

The reader 31 comprises a resonant circuit part 42 which comprises an inductor shown at 43 and a capacitor C1 shown at 44 connected in parallel. A frequency generator 45 is connected to the resonant circuit part 42 to provide a driving signal.

The reader 31 further comprises a demodulator, generally shown at 46. The demodulator 46 comprises a power splitter 47 connected between the frequency generator 45 and the resonant circuit part 42 to split off a part of the driving signal to provide a reference signal. A coupler 48 is provided to split off a reflected signal reflected back from the resonant circuit part 42, and pass the reflected signal to a multiplier indicated at 49. The multiplier 49 multiplies the reflected signal received from the coupler 48 and the reference signal received from the splitter 47 and passes the output to a low pass filter 50. The low pass filter 50 passes the signal corresponding the phase difference between the reference signal and the reflected signal to an output 51.

The inductor L1 43 comprises an antenna of the reader 31, and the inductor 35 comprises an antenna of the tag 30.

The reference signal from the splitter 47 will be of the form $$S(t)=A\cos(\omega t)$$

and the reflected signal R(t) tag will be of the form $$R(t)=a\cos(\omega t+\phi(t))$$

where
A=amplitude of the reference signal,
a=amplitude of the reflected signal
$\phi(t)$=the relative phase and
$\omega$=the frequency of the signal generated by the frequency source 45.

R(t) is multiplied by the carrier reference signal S(t) at the multiplier 49, producing a resulting signal $$\frac{aA}{2}\cos(2\omega t+\varphi(t))+\frac{aA}{2}\cos(\varphi(t))$$

The first of these terms, the second harmonic, is simply filtered by the low pass filter 50 leaving the second term that comprises the phase difference between the reference and reflected signals. It is a known effect of resonant circuits that when the circuit passes a signal which has a frequency less than the resonant frequency of the resonant circuit, a phase lag is introduced to the passed signal frequency, whilst when the frequency is greater than that of the resonant circuit, a phase lead is induced. Thus, by modulating the frequency of the reflected signal by changing the resonant frequency of the resonant circuit part of the tag 32, the reflected signal will have a phase difference relative to the reference signal from the frequency source 45 which may easily be measured by the demodulator as discussed above.

Figure 4A:
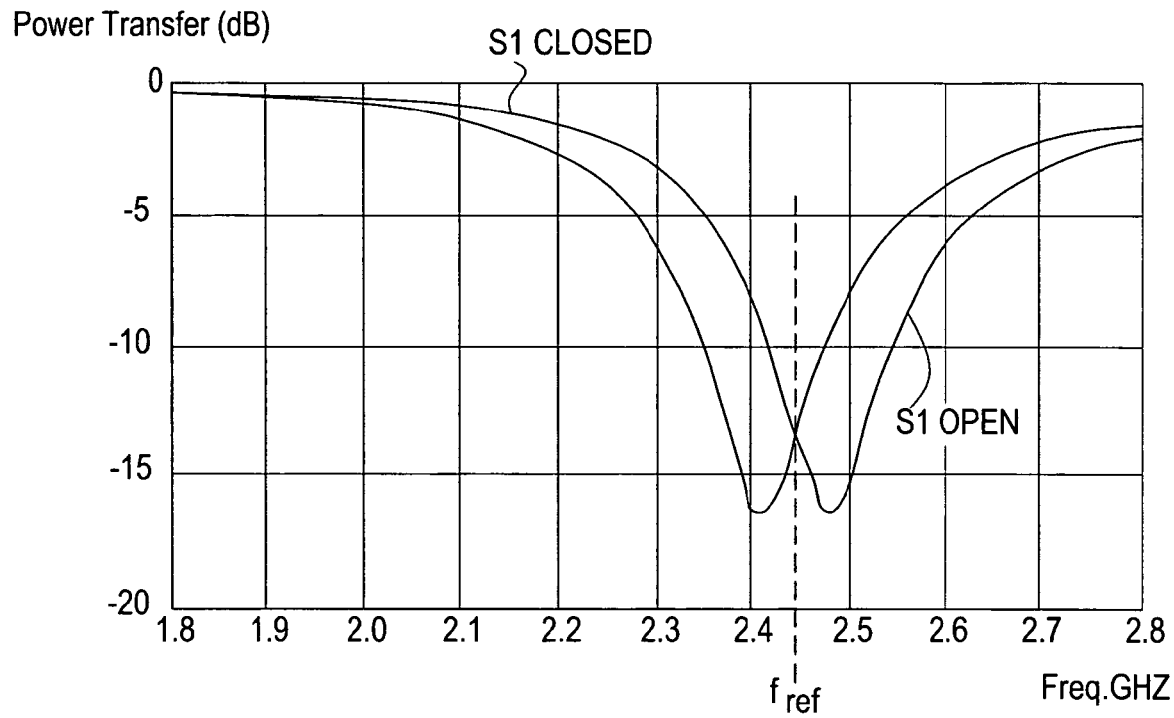
FIG. 4a is a graph showing variation in the amplitude of a reflected signal detected by the reader.
Figure 4B:
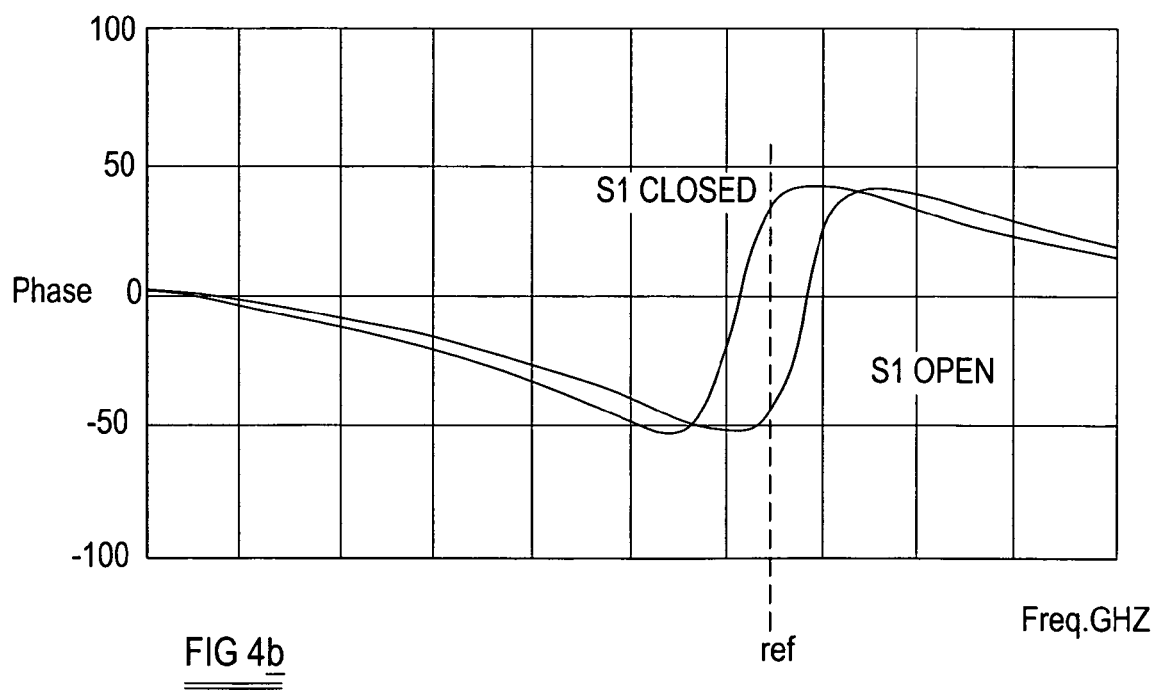
FIG. 4b is a graph showing variation in the phase of a reflected signal detected by the reader.

The effects of opening or closing the switch S1 are shown in the graphs of FIGS. 4a and 4b. The graph of FIG. 4a is a plot of the amplitude of the signal reflected back from the tag as measured at the connection between the coupler 48 and the multiplier 49. The minimum of each plot represents the maximum power transfer, when the resonant frequency of the resonant current part 32 matches the frequency of the signal from the frequency source 45. The change in the resonant frequency when S1 is closed and when S1 is open is apparent from the two plots on the graphs. It will be apparent by selecting the resonant frequencies of the resonant circuit 32 when S1 is closed and S1 is open to lie either side of the resonant frequency of the resonant circuit part 42, $F_{ref}$, that the curves for S1 closed and S1 open intersect as near to $F_{ref}$ as possible and so there is no or minimal change in the transferred power when S1 is closed and when S1 is open. There is of course some loss in coupling efficiency, in that because the resonant circuit part 32 is slightly de-tuned from the resonant frequency of the resonant circuit 42, maximum power transfer will not occur, however, the relative loss in the power transfer is balanced against the constant of power transfer achieved. From the phase plot of FIG. 4b, the relatively small change in resonant frequency leads to a relatively large change in phase with reference to the reference frequency.

Figure 5:
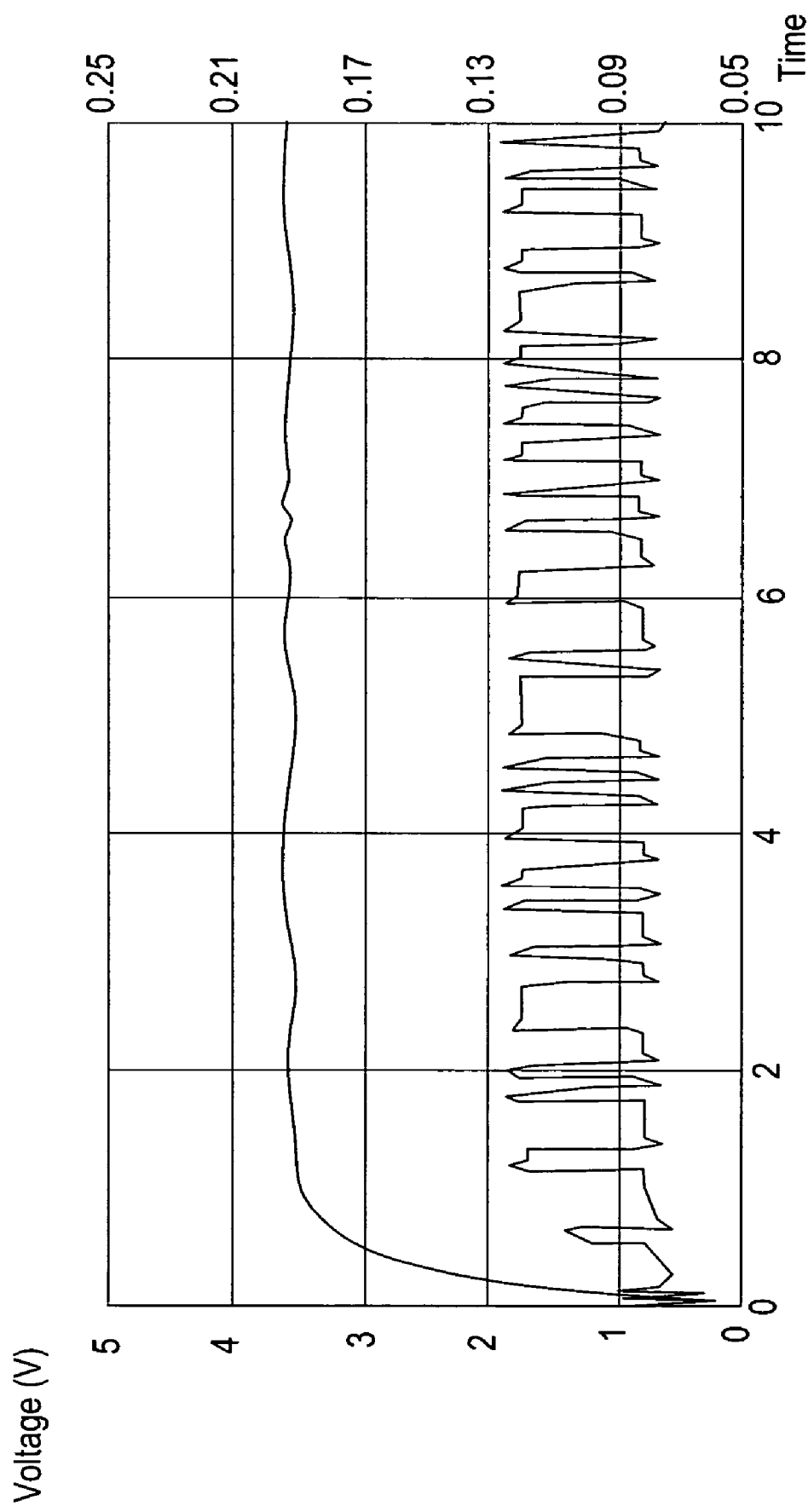
FIG. 5 is a graph showing data transmitted by the tag of FIG. 2 and an output voltage requested by a rectifying circuit of the tag of FIG. 2.

Where, for example, where S1 is closed, to represent digital "one", and where S1 is open, to represent a digital "0", the relative phase of the reflected signal will vary between one of two values and the output of the demodulator 46 will be a train of pulses as shown in the lower plot of FIG. 5c. Meanwhile, because the transferred power is generally the same when S1 is opened and closed as shown in FIG. 3a, the DC supply generated in the tag will be generally constant and stable, as shown in the top plot of FIG. 5c.

Figure 3A:
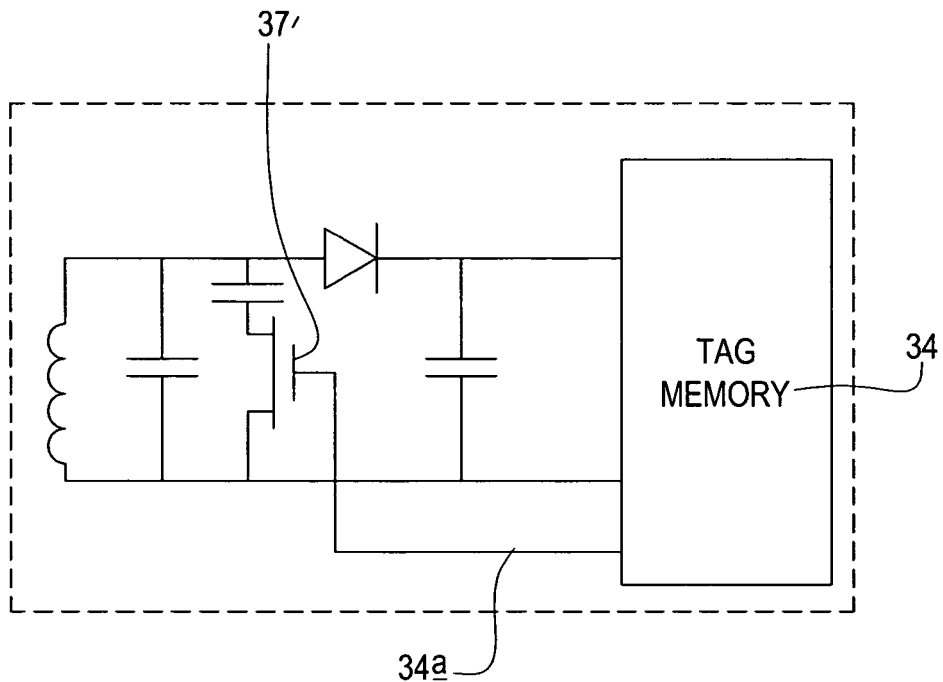
FIG. 3a is a diagrammatic circuit diagram of a further tag embodying the present invention.
Figure 3B:
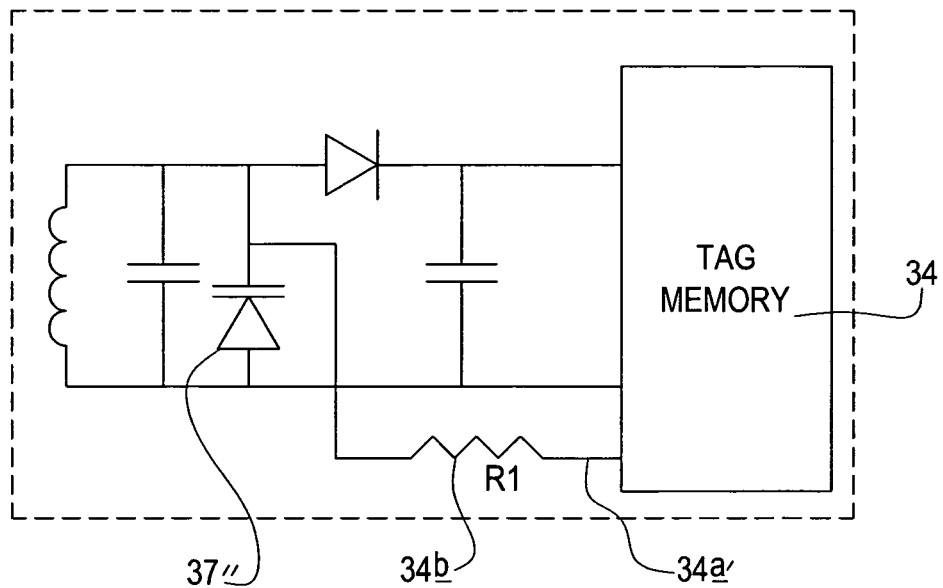
FIG. 3b is a diagrammatic illustration of a yet further tag embodying the present invention.

Two possible implementations of the variable capacitance device 37 are shown in FIGS. 3a and 3b. In FIG. 3a, the switch 37 is provided by an transistor 37', in this case a field effect transistor (FET) controlled by a control line 34a to the memory 34 and connected to the gate of the FET. In the alternative of FIG. 4b, the switch 37 is provided by a varactor diode 37" connected with its cathode connected to the memory 34 via control line 34a. The control line 34a' is provided with a resistor R1 34b. Since the varactor diode 37" is only required to be reverse-biased, the resistor R1 34b can be of a relatively high resistance. This high resistance then prevents any RF energy at the varactor cathode entering the memory 34. A characteristic of a varactor diode is that the capacitance falls with increasing reverse bias. Thus when a relatively high voltage is supplied to the cathode of the varactor diode 37" via the control line 34a', its capacitance will be relatively low and thus the resonant frequency of the resonant circuit part will be relatively high. When no voltage is applied to the cathode of the varactor diode 37", its capacitance will be relatively high and the resonant frequency of the resonant circuit part will be relatively low. Of course, it will be apparent that the varactor diode 37" may be used to modulate the resonant frequency of the resonant circuit of 32 and thus the detected phase between multiple levels, or even in an analogue fashion as required.

In a preferred embodiment, the resonant frequency of the resonant circuit part 42, and hence the frequency of the signal generated by the frequency source 45 is about 2.45 GHz, and the resonant frequency of the resonant circuit part 32 is modulated by about 0.05 GHz either side of this reference frequency. At this frequency, component values for the inductors and the capacitors are small, allowing easy integration of the circuit and require relatively small areas of silicon on an integrated circuit. It is particularly desirable that the tag 30 be provided as a integrated circuit, for example as a CMOS integrated circuit.

Although the embodiments described herein use a variable capacitance element to vary the resonant frequency of the tag resonant circuit part, it will be apparent that the resonant frequency may be varied by other means as desired. For example, a variable inductive element may be provided, or a second inductor may be switched in and out of the resonant circuit part.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A reader for reading a memory tag, the reader comprising a frequency source to generate a driving signal and a resonant circuit part connected to the frequency source operable to provide inductive coupling to a tag, the reader being operable to receive information from a tag via the resonant circuit part, the reader comprising a demodulator operable to compare a reference signal corresponding to the driving signal generated by the frequency source and a reflected signal from the resonant circuit part and generate an output depending on the relative phase of the reference signal and the reflected signal, the demodulator comprising a multiplier operable to multiply the reference signal and the reflected signal and a low pass filter to pass a signal corresponding to the relative phase.

2. A method of transmitting data from a memory tag to a reader, wherein the memory tag comprises a resonant circuit part having a resonant frequency, the method comprising the step of varying the resonant frequency of the resonant circuit part to transmit data to the reader, wherein the resonant circuit part comprises a variable capacitance element, and the step of varying the resonant frequency of the resonant circuit part comprising the steps of varying the capacitance of the variable capacitance element to have a first capacitance corresponding to a binary "one" and varying the capacitance of the variable capacitance element to have a second capacitance corresponding to a binary "zero" for data to be transmitted to the reader, and such that a power transfer from the resonant circuit part of the memory tag to a resonant circuit part of the reader is substantially the same for both the first capacitance and the second capacitance.

3. A method of reading data from a memory tag, the method comprising the steps of supplying a driving signal to a resonant circuit part of a reader, comparing a reference signal corresponding to the driving signal and a reflected signal reflected from the resonant circuit part, and detecting the relative phase of the reference signal and the reflected signal, wherein the step of comparing the reference signal and the reflected signal comprises the steps of multiplying the reflected signal and the reference signal, and passing the resulting signal through a load pass filter, wherein the output of the low pass filter is dependent on the relative phase.

4. A memory tag responsive to a signal generated by a reader, the memory tag comprising a resonant circuit part having a resonant frequency and a rectifying circuit part operable to rectify a signal received from the resonant circuit part to supply power to a memory, the resonant frequency of the resonant circuit part being variable in accordance with data to be transmitted to transmit data to the reader, the power supplied by the rectifying circuit part being substantially constant, wherein the resonant circuit part comprises a variable capacitance element, the variable capacitance element being controllable to vary the resonant frequency of the resonant circuit part, wherein the controllable capacitance element is set to have a first capacitance corresponding to a binary "one" and a second capacitance corresponding to a binary "zero" for data to be transmitted to the reader, and such that a power transfer from the resonant circuit part of the memory tag to a resonant circuit part of the reader is substantially the same for both the first capacitance and the second capacitance.

5. A memory tag according to claim 4 wherein the resonant circuit part comprises an inductor and a first capacitor, and wherein the variable capacitance element comprises a second capacitor connected in parallel with the first capacitor and in series with a switch operable to switch the second capacitor element out of the circuit.

6. A memory tag according to claim 4 wherein the resonant circuit part comprises an inductor and wherein the controllable capacitive element comprises a varactor diode connected in parallel with the inductor and wherein a control line is connected to the cathode of the varactor diode to vary the reverse bias voltage of the varactor diode.

7. A memory tag according to claim 6 wherein the resonant circuit part comprises a first capacitor connected in parallel with the inductor.

8. A memory tag responsive to a signal generated by a reader, the memory tag comprising a resonant circuit part having a resonant frequency, the resonant frequency of the resonant circuit part being variable in accordance with data to be transmitted to transmit data to the reader, the resonant circuit part comprising a variable capacitance element wherein the variable capacitance element is controllable to vary the resonant frequency of the resonant circuit part, wherein the resonant circuit part comprises a variable capacitance element, the variable capacitance element being controllable to vary the resonant frequency of the resonant circuit part, wherein the controllable capacitance element is set to have a first capacitance corresponding to a binary "one" and a second capacitance corresponding to a binary "zero" for data to be transmitted to the reader, the first capacitance corresponding to a resonant frequency of the resonant circuit part of the memory tag slightly detuned from a resonant frequency of a resonant circuit part of the reader in a first direction, the second capacitance corresponding to a resonant frequency of the resonant circuit part of the memory tag slightly detuned from a resonant frequency of a resonant circuit part of the reader in a second direction opposite to the first direction.

9. A memory tag according to claim 8 comprising a rectifying circuit part operable to rectify a signal received from the resonant circuit part to supply power to a memory.

10. A memory tag according to claim 8 wherein the resonant circuit part comprises an inductor and a first capacitor, and wherein the variable capacitance element comprises a second capacitor connected in parallel with the first capacitor and in series with a switch operable to switch the second capacitor element out of the circuit.

11. A memory tag according to claim 8 wherein the resonant circuit part comprises an inductor and wherein the controllable capacitive element comprises a varactor diode connected in parallel with the inductor and wherein a control line is connected to the cathode of the varactor diode to vary the reverse bias voltage of the varactor diode.

12. A memory tag according to claim 8, wherein the tag is operable to vary the resonant frequency of the resonant circuit part by setting the resonant frequency of the resonant circuit part to one of a first resonant frequency and a second resonant frequency, such that relative to a reader resonant frequency of a resonant circuit part of the reader, the first resonant frequency and the second frequency lie on either side of the reader resonant frequency.

13. In combination, a memory tag and a reader for reading the memory tag, the reader comprising a frequency source to generate a driving signal and a resonant circuit part having a reader resonant frequency connected to the frequency source operable to provide inductive coupling to a tag, the memory tag comprising a resonant circuit part having a tag resonant frequency, the tag resonant frequency of the resonant circuit part being variable relative to the reader resonant frequency of the reader resonant circuit part to transmit data to the reader, the memory tag further comprising a rectifying circuit operable to rectify signal received from the memory tag resonant circuit part when inductively coupled with the reader resonant circuit part to supply power to a memory of the tag, the reader comprising a demodulator operable to compare a reference signal corresponding to the driving signal and a reflected signal from the resonant circuit part, the relative phase of the reference signal and the reflected signal being dependent on the resonant frequency of the memory tag resonant circuit part, and generate an output depending on the relative phase of the reference signal and the reflected signal, the power supplied by the rectifying circuit part to the memory being substantially constant.

14. A memory tag and a reader according to claim 13 wherein the resonant circuit part of the memory tag comprises a variable capacitance element, the variable capacitance element being controllable to vary the resonant frequency of the resonant circuit part.

15. A method of transmitting data from a memory tag to a reader, wherein the memory tag comprises a resonant circuit part having a resonant frequency, the method comprising the step of varying the resonant frequency of the resonant circuit part to transmit data to the reader, wherein the resonant circuit part comprises a variable capacitance element, and the step of varying the resonant frequency of the resonant circuit part comprising the steps of varying the capacitance of the variable capacitance element to have a first capacitance corresponding to a binary "one" and varying the capacitance of the variable capacitance element to have a second capacitance corresponding to a binary "zero" for data to be transmitted to the reader, the first capacitance corresponding to a resonant frequency of the resonant circuit part of the memory tag slightly detuned from a resonant frequency of a resonant circuit part of the reader in a first direction, the second capacitance corresponding to a resonant 1 of the resonant circuit part of the memory tag slightly detuned from a resonant 1 of a resonant circuit part of the reader in a second direction opposite to the first direction.

16. A method according to claim 15 wherein the steps of varying the resonant frequency of the resonant circuit part comprises setting the resonant frequency of the resonant circuit part to one of a first resonant frequency and a second resonant frequency, wherein relative to a reader resonant frequency of a resonant circuit part of the reader, the first resonant frequency and the second resonant frequency lie on either side of the reader resonant frequency.

* * * * *